United States Patent [19]

Nevitt

[11] 4,187,715
[45] Feb. 12, 1980

[54] METHOD AND APPARATUS FOR DIMENSIONAL GAGING WITH FLUID PRESSURE

[75] Inventor: James S. Nevitt, Bellbrook, Ohio

[73] Assignee: The Bendix Corporation, Southfield, Mich.

[21] Appl. No.: 922,705

[22] Filed: Jul. 7, 1978

[51] Int. Cl.² ............................................. G01B 13/10
[52] U.S. Cl. .................................................... 73/37.9
[58] Field of Search ................... 73/37.9, 37.5; 137/82

[56] References Cited

U.S. PATENT DOCUMENTS

| | | | |
|---|---|---|---|
| 2,636,380 | 4/1953 | Van Dorn | 73/37.9 |
| 2,706,397 | 4/1955 | Byrkett | 73/37.5 |
| 2,795,855 | 6/1957 | Worthen | 73/37.5 X |
| 2,925,692 | 2/1960 | Hitchner | 73/37.5 X |
| 3,056,280 | 10/1962 | Brewer | 73/37.5 |
| 3,178,931 | 4/1965 | Kirk | 73/37.9 X |
| 3,353,402 | 11/1967 | Caligiuri | 73/37.9 X |
| 3,621,862 | 11/1971 | Wojtecki | 137/82 |
| 3,792,605 | 2/1974 | Rabenau | 73/37.9 |

FOREIGN PATENT DOCUMENTS 937054  9/1963  United Kingdom ..................... 73/37.9

*Primary Examiner*—Gerald Goldberg
*Assistant Examiner*—Joseph W. Roskos
*Attorney, Agent, or Firm*—Kenneth A. Seaman; Raymond J. Eifler

[57] ABSTRACT

A back pressure fluid gaging circuit for measuring dimensions of a workpiece. The gaging circuit (100) includes gage tooling (190) including at least one fluid jet (192) disposed to be directed at a surface (210) of the workpiece (200), with variations in the distance between the surface (210) and the tooling (190) providing a varying back pressure of the fluid which is measured by a gage (150) located intermediate the length of a conduit (170) connecting a source (110) of fluid under pressure with the tooling (190). First and second adjustable (variable) fluid passage restrictions (130, 140) in the conduit (170, are adjusted to provide an output within a range that can be displayed by the gage (150) for the particular tooling selected. One of the adjustable restrictions (130) is located along the conduit between the source (110) of pressurized fluid and the gage (150) and the other restrictions (140) between the gage (150) and the tooling (190). The use of two adjustable passage restrictions allows the use of a constant (non-varying) fluid pressure source, supplied by a fixed fluid pressure regulator (120).

5 Claims, 6 Drawing Figures

METHOD AND APPARATUS FOR DIMENSIONAL GAGING WITH FLUID PRESSURE

TECHNICAL FIELD

The present relates to dimensional measuring devices. More particularly, this invention relates to measuring apparatus using fluid back pressure to measure dimensional variations in workpieces.

BACKGROUND ART

Back pressure fluid gaging circuit are well known in the art and, in one embodiment, consist of gage tooling equipped with an air jet supplied with fluid under a variable regulated fluid pressure. Changes in pressure upstream (the back pressure) of the jet, caused by variation in the distance between the workpiece and the gage tooling, are used to measure the distance and thus the dimensional variations in the workpiece.

While generally satisfactory, such tooling has inherent limitations. Typically, these systems require a fluid pressure regulator which is adjustable during set-up for operation to provide an output which is within the display range of the output device for the entire measuring range. Use of a variable fluid pressure regulator requires in many applications that the regulator be arranged in the measuring system in a rather specific and cumbersome orientation which dictates that the product including such a regulator be rather large and bulky. One such apparatus is shown in the U.S. Pat. No. 3,792,605 to Rabenau for "Method and Circuit for Fluid Pressure Gaging".

Other undesirable features of some prior art fluid or air gaging systems include a rather high consumption of pressurized fluid or air and a rather slow response time. Both features reduce the effectiveness of the air gaging systems for industrial applications where it is desirable to gage a large number of workpieces quickly and efficiently and with a minimum use of pressurized fluid.

Another limitation of some prior art fluid gaging systems for dimensional measurement is that they do not provide a back pressure which varies linearly over a wide range of distances (gaps) between the tooling and the surface of the workpiece or which are dependent upon the type or location of gaging tooling used. Examples of such prior art are shown in U.S. Pat. Nos. 3,178,931; 2,636,380; 2,706,397; 2,925,692; 3,621,862; 3,353,402; and 2,795,855.

Accordingly, the dimensional fluid pressure gaging circuits of the prior art have significant limitations and disadvantages.

SUMMARY OF THE INVENTION

It is an object of the present invention to provide a back pressure fluid gaging circuit which overcomes the disadvantages and limitations of the prior art systems, while providing a gaging circuit that is accurate, easy to use and inexpensive.

It is a further object of the present invention to provide a back pressure fluid gaging circuit which has a good linear response and which is reasonably independent of a variation in the tooling line resistance.

It is also an object of the present invention to provide a fluid pressure gaging circuit which has a relatively low consumption of pressurized fluid.

The gaging circuit of the present invention also has the advantage that it has relatively good response time in that the output is in its final state rather quickly once the tooling and workpiece are positioned. This advantage allows a large number of workpieces to be gaged in a relatively short period of time.

An other feature of the present invention is that the total fluid pressure resistance downstream of the gage output (e.g. the display) device may be kept constant by varying a downstream adjustable passage restriction. As the resistance of the tooling line is changed, the adjustment of the passage restriction compensates for the change in tooling line resistance. The provision a constant total fluid resistance downstream of a gage provides a good linear response of the output over a wide range of gap dimensions and accurate dimensional measurements.

The present invention is a back pressure fluid gaging circuit (100) having a conduit (170) for coupling a source (110) of fluid under pressure (as regulated by a fixed regulator (120) with gage tooling (190) including at least one fluid jet (192) directed at a surface (210) of a workpiece (200). The circuit (100) in its preferred embodiment includes an output gage or display (150) intermediate the length of the conduit, with first and second variable passage restrictions (130, 140), one (130) located between the source (110) and the gage (150) and the second (140) between the gage (150) and the tooling (190), respectively.

Other objects and advantages of the apparatus of the present invention will be apparent to one skilled in the art in view of the following description and claims taken in conjunction with the accompanying drawings.

BRIEF DESCRIPTION OF THE DRAWINGS

FIG. 5 is a schematic representation of an alternate embodiment of the back pressure gaging circuit of the present invention.

FIG. 6 is a schematic representation of a second alternate embodiment of the gaging circuit of the present invention.

DETAILED DESCRIPTION OF THE DRAWINGS

Figure 1:
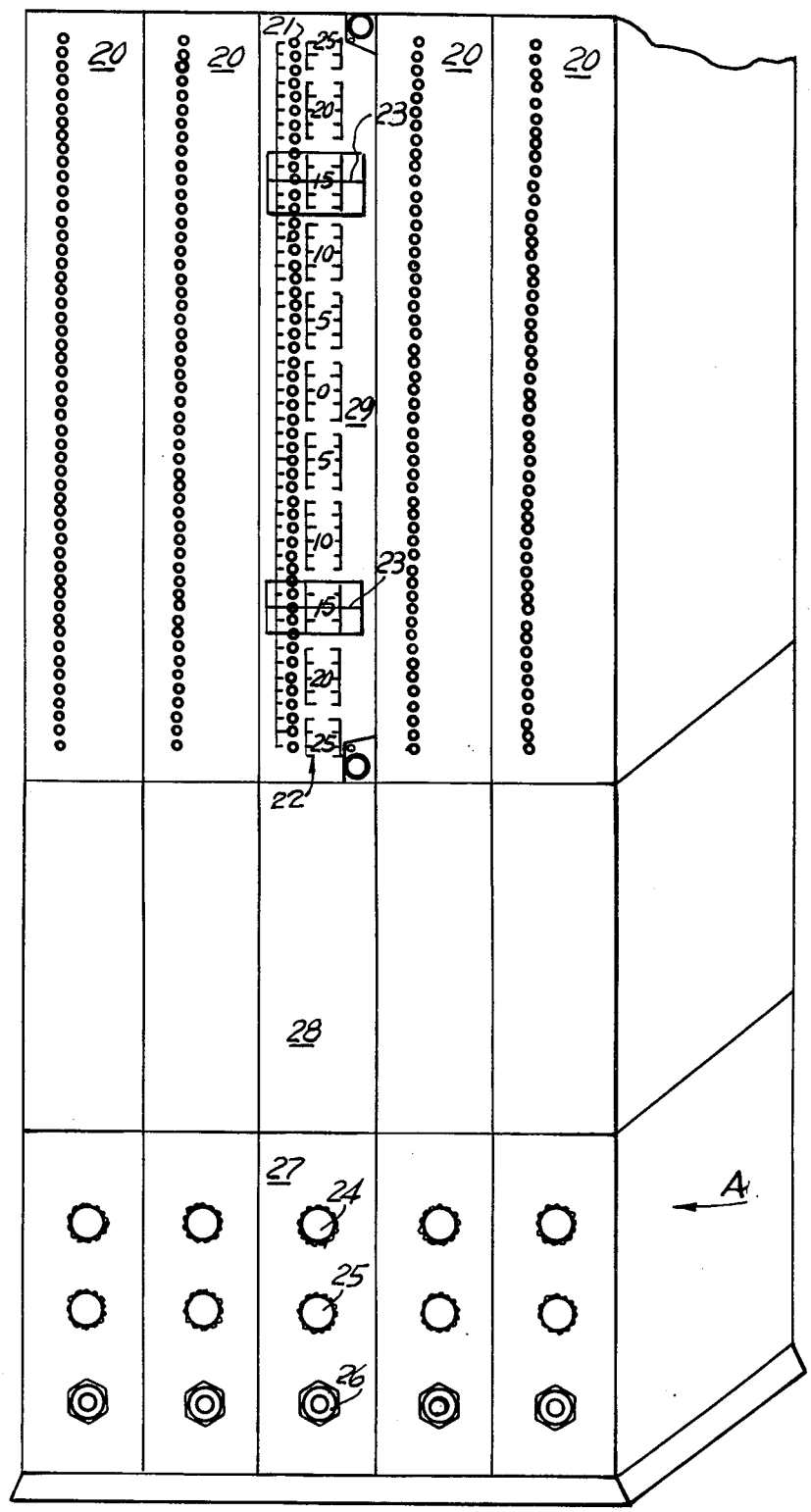
FIG. 1 is a perspective view of an apparatus having a plurality of fluid gaging circuits of the present invention and a plurality of displays.

FIG. 1 is a perspective view of measuring apparatus 10 including the present invention. The apparatus 10 includes a plurality of dimensional gaging and display circuits 20, each located adjacent the other and each for gaging a different part of different portion of the same part.

Each gaging and display circuit 20 includes a lower housing 27, a middle housing 28 and an upper housing 29. The upper housing 29 includes a display having a plurality of display elements 21, and a scale 22 and a pair of verniers 23. The display elements 21 are advantageously a stacked column of light emitting diodes, one of which is energized to provide a visual indication of a dimensional reading. The display elements and a decoding and driving circuit for a similar system are described in detail in U.S. Pat. No. 3,825,827 to G. L. Tumbush for "Columnar Display for Electrical Signals With Digital Signal Limit Set". The scale 22 is calibrated with a graduated dimensional representation for each of the display elements 21. The verniers 23 are each a vertically-movable transparent piece having a horizontal line across it and are positioned along the scale to define the limits of acceptable dimensional measurements (e.g. the minimum).

The upper housing 29 preferably includes the decoding and driving circuitry for the display. Examples of such circuitry are generally known in the art and form no basis of the present invention, and accordingly are not described in detail. However, an analog representation (e.g., a voltage) of a dimension is translated into a digital representation which is used to energized the appropriate display element 21. If desired, a plurality of display elements 21 could be simultaneously energized if a particular effect is desired (e.g., a "thermometer" effect, where all display elements up to and including the indicated dimension are energized).

The middle housing 28 may be empty or may include optional circuitry chosen from many conventional types. Such optional circuitry might include a limit module or a total indicator reading (Sometimes referred to as a "TIR") module.

The lower housing 27 includes internally the pneumatic gaging circuitry of the present invention and externally adjustment knob assemblies 24, 25 and a mounting stem 26 for gage tooling (not shown). The adjustment knob assemblies 24, 25 are used to "set up" the display and gaging circuit to begin use, by using appropriate masters as discussed later in this application.

The front panel of the lower housing 27 is preferably removable to allow access to the adjustable portions of the gaging circuit, in view of industry preferences. The industry preference stems from the fact that changing the adjustable portions may be required to change the dimensional range of the tooling (i.e., the range of part dimensions to be measured). In such cases, the adjustable elements must be easily and quickly removed without disassembling the several gaging and display circuits 20, one from another, which requires that the access be through the front panel (the back panel, while exposed, is less easily accessible.)

Figure 2:
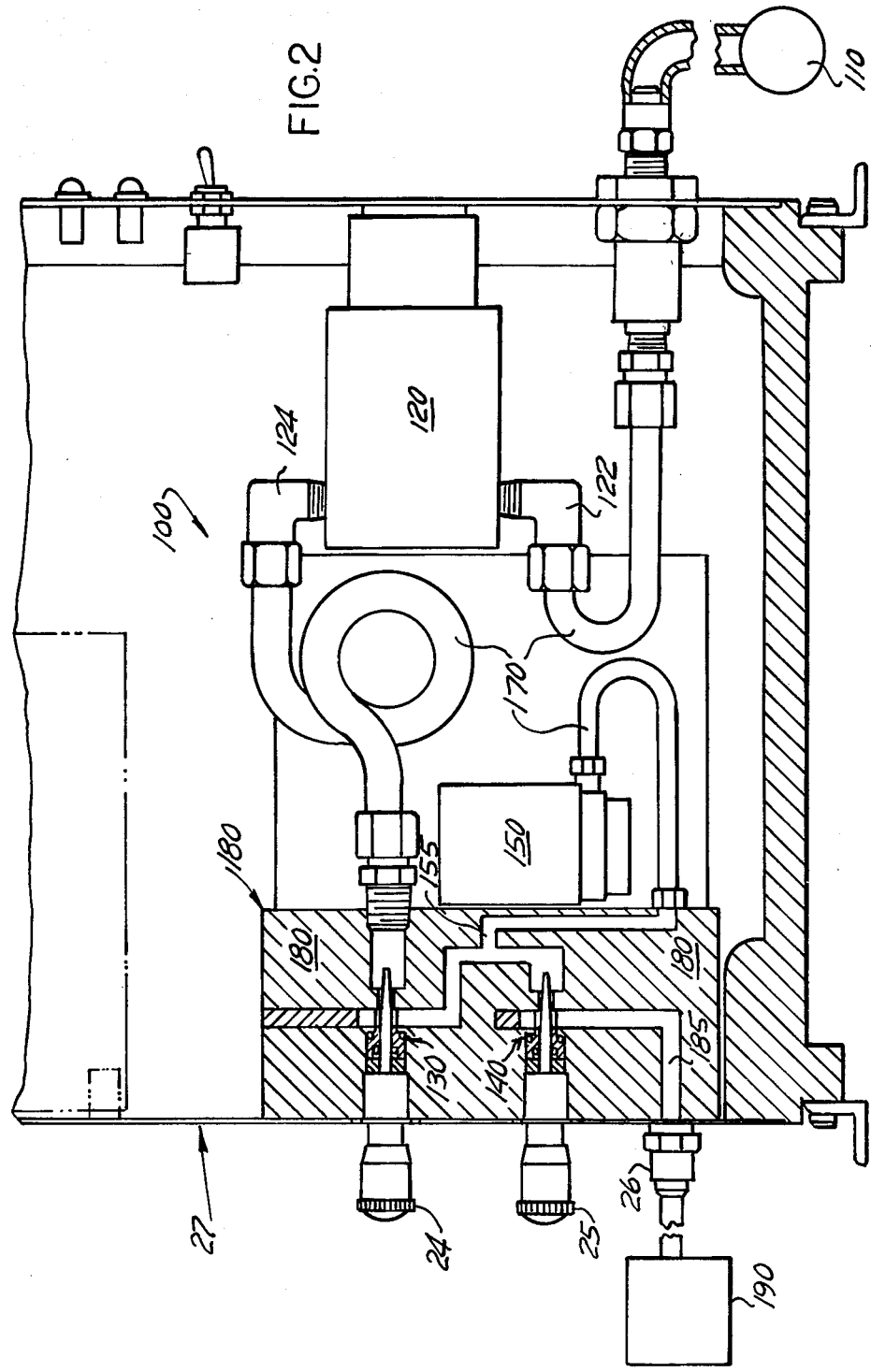
FIG. 2 is a partial cross-sectional side view of the lower portion of the apparatus of FIG. 1, looking in the direction of the arrow A in FIG. 1.

FIG. 2 illustrates a pneumatic gaging circuit 100 of the present invention. The pneumatic gaging circuit would be visible looking in the direction of the arrow A in FIG. 1, with the side panel removed from the lower housing 27.

The pneumatic gaging circuit 100 includes a source 110 of fluid (preferably air) under pressure which is supplied to a fluid pressure regulator 120. The fluid from the regulator is supplied to a first adjustable fluid passage restrictor 130, and thence to a second adjustable fluid passage restrictor 140, thence to gage tooling 190, through the mounting stem 26. Intermediate the first restrictor 130 and the second restrictor 140 is a tap 155 to which a gage or gaging apparatus or display is attached to register the fluid pressure at the tap 155. A conduit 170 connects the various portions of the gaging circuit 100 one to the next.

The source 110 of air under pressure may be from a compressor or a pressurized cylinder. The source 110 must be at a pressure above the output pressure from the pressure regulator 120, but is assumed to be at a pressure which fluctuates, or which may fluctuate, due to internal loading at a particular circuit or due to external loading at other stations or circuits.

The fluid pressure regulator 120 is preferably a pressure regulator model 80, manufactured by Fairchild-Industrial Products Division. This fluid pressure regulator 120 is adapted to receive fluid pressure on an input 122 and provide a constant fluid pressure on the output 124 despite variations in the input pressure or the downstream (of the output) loading. The regulator 120 is adjusted to provide a pressure of 30 psi, and must be regulated to provide no more than 0.2 psi deviation, in the preferred embodiment of this invention. This pressure allows a good linear pressure response for open-jet tooling having gaps of 0.0005 to 0.005 inches between a workpiece surface and a gage tooling jet directed at the workpiece surface. For Plunjet-brand gaging cartridges, a linear pressure response can be obtained for measuring up to 0.080 inches.

Although the preferred regulator 120 is itself adjustable, it is preferably fixed at the factory during manufacturing to provide a fixed, non-adjustable fluid pressure regulator thereafter. In use, the operator does not adjust the regulator, and thus it need not be mounted for front removal or access during set up. In this way, the regulator 120, which is approximately 40 mm. square from the front as mounted and which has a depth, as mounted, of over 40 mm. may be included in a column which is advantageously no more than 50 mm. wide on the outside. If the regulator were adjustable in normal operation for set-up, the industry preferences requiring front removal and the standard manufacturing methods of providing an inwardly-extending forward flange on one or each side of the front for mounting the front panel would require a wider column.

The wider column would be undesirable in that it would take up more space.

The first adjustable fluid passage restrictor 130 and the second adjustable fluid passage restrictor 140 are mounted to a manifold 180 which is attached to the lower housing 27. The manifold 180 also includes the tap 155 for the gage 150 and has a passage 185 coupling the second restrictor 140 to the mounting stem 26. The manifold 170 is preferably made from aluminum.

The gaging apparatus 150 shown in FIG. 2 is preferably a pressure-to-voltage transducer of the type made by Gulton as model GS130. The output voltage from the transducer varies as a function of the pressure at the tap 155, preferably linearly with the pressure.

The conduit 170 may be any suitable connecting tubing which will withstand the fluid pressure and which may be coupled to the fittings on the manifold 180, the mounting stem 26 and the regulator 120. Flexible plastic or rubber tubing chosen from one of several known varieties could be used to advantage in this design.

The gage tooling 190 is chosen from the air gaging tooling available commercially, as is sold in conjunction with Precisionaire brand air gaging apparatus sold by The Bendix Corporation. Airsnaps, rings, spindles, discs and Plunjet brand gaging cartridges would be appropriate, as gage tooling depending upon the type of workpiece surface to be gaged.

Figure 3:
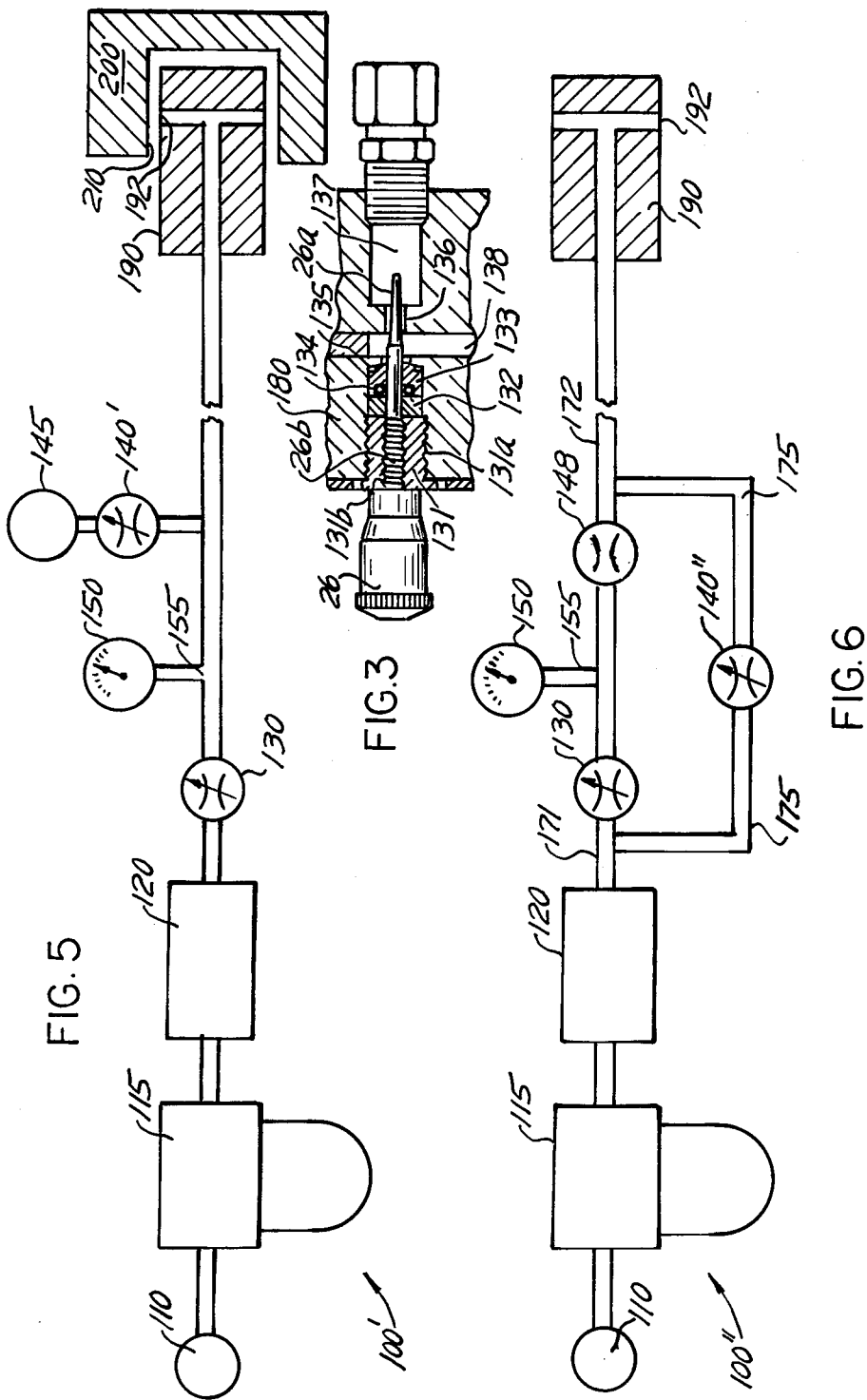
FIG. 3 is a cross-sectional, enlarged view of a variable fluid passage restriction shown in FIG. 2.

FIG. 3 is an enlarged view of the variable passage restriction 130 and the adjusting knob 24 as shown in FIG. 2. The variable passage restriction 130 includes an insert member 131, a first space 132, a second spacer 133, a first 0-ring seal 134 and a second 0-ring seal 135. The insert member 131 is a hollow cylindrical member which has external threads 131a screwed into threads in the manifold 180 to retain the insert member 131 and also has internal threads 131b. The adjusting knob assembly 24 includes a threaded shaft portion 24a in the medial part and a forward tapering end portion 24b. The threaded shaft portion 24a has external threads which received by the internal threads 131b of the insert member 131 to retain the adjusting knob assembly 24.

The first spacer 132 and the second spacer 133 are held in place by the insert member 131 which is screwed into the manifold 180 to compress the spacers. The first spacer 132 is annular in shape, while the second spacer 133 is annular with the forward undercut about the outer peripheral surface and rearwardly has an undercut about its inward peripheral surface. The two undercuts each receive one of the O-ring seals 134, 135 which seal the fluid passage from the insert member 131 and adjusting knob assembly 24 to prevent the escape of fluid from the fluid passage.

The fluid passage in the adjustable fluid passage restriction 130 is from an inlet 137 to an outlet 138 through a necked-down passage restriction 139. The forward tapered end portion 24b extends into the necked-down passage restriction 139 and serves to regulate or adjust the rate at which fluid can pass therethrough, depending upon how far the tapering end is forward. The farther forward it is, the slower the fluid can pass through to the outlet. The second adjustable fluid passage restriction 140 is substantially identical to FIG. 3.

Figure 4:
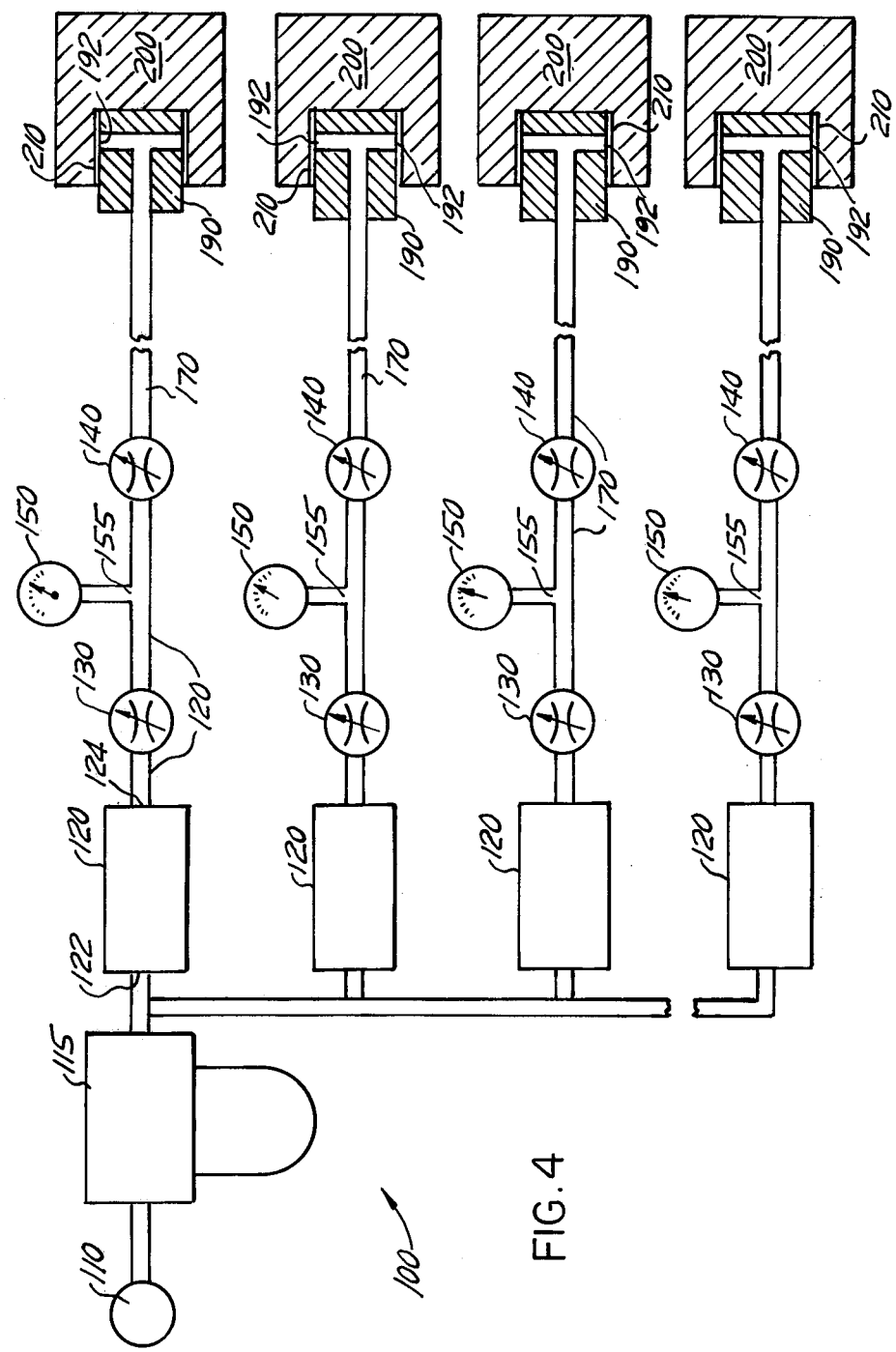
FIG. 4 is a schematic representation of several back pressure gaging circuits of the present invention, coupled to a single source of pressurized and filtered fluid.

FIG. 4 is a schematic arrangement depicting several fluid pressure gaging circuits 100 of the present invention. In its preferred embodiment, pressurized fluid from the source 110 of pressurized fluid passes through a filter 115 and is supplied to a plurality of fixed pressure regulators 120, each of which is associated with a separate dimensional gaging circuit. The filter is preferably a quart capacity filter of the type made by Facet Enterprises and sold by Bendix Automation and Measurement as Part 60106428 and may be conveniently coupled to six separate gaging circuits.

Coupled to the output of each fixed pressure regulator 120 is the first variable fluid passage restriction 130. The second variable fluid passage restriction 140 is separated from the first variable fluid passage restriction 130 by the tap 155 for the gage (or display) 150. The gage tooling 190, which has a fluid passage terminating in at least one fluid jet (or opening) 192 directed at a surface 210 of a workpiece 200 being measured, is located downstream of the second passage restriction 140.

The distance (or gap) between the fluid jet 192 and the workpiece surface 210 determines the amount of fluid back pressure, or increase in pressure, at the tap 155 and thus what the gage 150 measures. The closer the jet 192 and the surface 210, the greater the pressure increase.

FIGS. 5 and 6 illustrate alternate embodiments to the preferred air (or fluid) gaging circuit illustrated primarily in FIGS. 2 and 4. Although these circuits are not generally as advantageous in terms of cost, response time, fluid consumption or linear range in some instances, these circuits have the similar advantage that they do not require a variable fluid pressure regulator. Also, in some applications, the response time, fluid consumption or linear range of these alternate embodiments has been shown to be comparable to the preferred embodiment.

FIG. 5 is an embodiment of a fluid gaging circuit 100' wherein a second adjustable fluid passage restriction 140' has been removed from the "series" connection with the first passage restriction 130 and the gage tooling 190 as it was in FIGS. 2 and 4. Instead, the second adjustable fluid passage restriction 140' is tapped off the conduit 170 and the output of the restriction 140' is vented to atmosphere at 145. The variable passage restriction 140' is still used to control the fluid pressure in the conduit 170 intermediate the gage tap 155 and the gage tooling 190.

FIG. 6 is an embodiment of a fluid gaging circuit 100" wherein a second variable fluid passage restrictor 140" is also removed from the "series" connection of FIGS. 2 and 4 and placed in a "feedback" loop or conduit 175. A fixed, non-variable passage restriction 148 has been found to be desirable in some designs of this embodiment, disposed between the gage tap 155 and the tooling 190. The feedback loop 175 preferably couples the conduit 171 between the fluid pressure regulator 120 and the first variable fluid passage restrictor with the conduit 172 between the fixed passage restriction 148 and the pressure relief valve. The second variable passage restriction 140" again is positioned within fluid gaging circuit of the system to adjust the fluid pressure in the conduit between the gage tooling 190 and the gage tap 155.

The fluid gaging circuit 100 of the present invention (or either alternate embodiment) may be "set-up" or prepared for operation in a method well known in the art by the use of a pair of masters, each of which has a dimension which is accurately known. Preferably, one master has a dimension near the upper scale limits and the other has a dimension near the lower scale limits. The first master is inserted into the gage tooling 190 and the first adjustable fluid passage restriction 130 is adjusted to adjust the display dimension (in the gage 150) to the known dimension of the first master. The first master is then removed from the tooling 190 and the second master is inserted into the tooling 190 and the second adjustable fluid passage restriction 140 is adjusted to achieve a dimension display which is the accurate (known) dimension for the second master. The process is repeated with the two masters and adjustment of the two adjustable passage restrictions until each master has an accurate dimensional display without adjusting either passage restriction.

The first and second variable passage restrictions may be considered "gain" and a "zeroing" adjustment, respectively.

The use of the second variable passage restriction 140 between the gage or display 150 and the gage tooling 190 allows the varying of the resistance (of the restriction of fluid flow) to compensate for variations in the tooling line resistance to fluid flow. In this manner, the total fluid resistance downstream of the gage may be kept constant for reasonable variations in tooling line resistance (i.e., up to the limits to which the restriction may be varied.) This constant downstream resistance allows a better, more-linear pressure response to variations in distance (i.e. dimension) of the workpiece surface and more accurate measurements.

While the preferred embodiment and two alternate embodiments have been disclosed herein with considerable detail, it will be apparent to one skilled in the art of fluid pressure dimensional measuring that some of the features of the present invention may be used without others and that many modifications may be made without departing from the spirit of the present invention. Other forms of gages or displays can be conveniently substituted for the disclosed apparatus. The variable fluid passage restrictions may be of a different design. Accordingly, the foregoing description should be considered as merely illustrative of the present invention, which is defined solely by the following claims.

Having thus described the invention, what is claimed is:

1. A fluid pressure gaging apparatus for indicating a dimension of a workpiece surface, said apparatus comprising:
    a fluid pressure regulator having an input and an output, said regulator adapted to receive a pressurized fluid at the input and to provide the fluid at a regulated pressure at the output;
    gage tooling including at least one opening formed in said gage tooling and directed at the workpiece surface;
    a fluid conduit connecting the output of the regulator with the gage tooling, said gaging tooling provides a fluid back pressure in the fluid conduit which varies with the distance between the opening and the workpiece surface;
    means for indicating the fluid pressure in the conduit as an indication of the dimension of the workpiece surface, said indicating means located intermediate the regulator and the gage tooling and coupled to the conduit at a first location; and
    means for adjusting the fluid pressure in the conduit, said means including a first variable passage restriction located in the conduit between the regulator and the first location and a second variable passage restriction disposed in the conduit between the first location and the tooling, said first and second variable passage restrictions each being in series connection with the conduit, whereby the first and second variable passage restrictions may be adjusted to adjust the indicated dimension on the indicating means.

2. A fluid pressure gaging apparatus of the type described in claim 1 wherein the indicating means includes a fluid pressure-to-voltage transducer and a means for displaying variations in the voltage.

3. A fluid pressure gaging apparatus of the type described in claim 2 wherein the means for displaying variations in the voltage include a plurality of vertical-arranged descrete indicators, each of which indicators represents displays a separate value of the dimension of the workpiece.

4. A fluid pressure gaging apparatus of the type described in claim 3 wherein the individual discrete display indicators are light emitting diodes.

5. An air pressure gaging apparatus for indicating a digital representation of a dimension of a workpiece surface, said apparatus comprising:
    an air pressure regulator having an input and an output, said regulator adapted to receive pressurized air at the input and to provide air at a fixed, regulated pressure at the output;
    gage tooling including at least one air jet formed in said gage tooling and directed at the workpiece surface;
    a conduit connecting the output of the regulator with the gage tooling, said gage tooling providing an air back pressure in the conduit which varies with the distance between the air jet and the workpiece surface;
    means for generating a digital representation indicating the air pressure in the conduit intermediate the regulator and the gage tooling as an indication of the dimension of the workpiece surface, said indicating means including a transducer coupled to the conduit at a first location and a digital display device coupled to the transducer for generating a digital representation of the dimension of the workpiece surface;
    a first variable conduit restriction for adjusting the air pressure displayed on the indicating means, said first restriction coupled to the conduit in a series connection between the regulator and the first location; and
    a second variable conduit restriction for adjusting the air pressure displayed on the indicating means, said second restriction located along the conduit in a series connection between the first location and the tooling, whereby the first and second variable conduit restrictions may be adjusted to adjust the indication on the indicating means.

* * * * *